(12) United States Patent
Tang

(10) Patent No.: US 9,088,194 B2
(45) Date of Patent: Jul. 21, 2015

(54) STRUCTURE FOR HEAT DISSIPATION OF MOTORS

(75) Inventor: Songfa Tang, Zhongshan (CN)

(73) Assignee: Zhongshan Broad-Ocean Motor Co., Ltd., Zhongshan (CN)

( * ) Notice: Subject to any disclaimer, the term of this patent is extended or adjusted under 35 U.S.C. 154(b) by 204 days.

(21) Appl. No.: 13/315,285

(22) Filed: Dec. 8, 2011

(65) Prior Publication Data

US 2012/0169162 A1   Jul. 5, 2012

(30) Foreign Application Priority Data

Dec. 31, 2010   (CN) ...................... 2010 2 0698174 U

(51) Int. Cl.
*H02K 11/00*   (2006.01)
*H02K 9/00*   (2006.01)
*H02K 5/18*   (2006.01)

(52) U.S. Cl.
CPC .............. *H02K 11/0073* (2013.01); *H02K 5/18* (2013.01)

(58) Field of Classification Search
CPC ............................ H02K 11/0073; H02K 5/18
USPC ............................ 310/64; 361/697; 165/80.3
See application file for complete search history.

(56) References Cited

U.S. PATENT DOCUMENTS

| 4,541,004 | A | * | 9/1985 | Moore ........................ 257/706 |
| 5,019,880 | A | * | 5/1991 | Higgins, III ................ 257/714 |
| D437,844 | S | * | 2/2001 | Sayers et al. ............... D14/240 |
| 2004/0183385 | A1 | * | 9/2004 | Takahashi et al. .......... 310/68 D |
| 2006/0192446 | A1 | * | 8/2006 | Ihata et al. ................. 310/68 D |
| 2009/0288806 | A1 | * | 11/2009 | Lin ............................ 165/80.3 |
| 2010/0026109 | A1 | * | 2/2010 | Hassett et al. .............. 310/54 |
| 2010/0038981 | A1 | * | 2/2010 | Urano et al. ............... 310/54 |
| 2010/0177480 | A1 | * | 7/2010 | Koplow ..................... 361/697 |
| 2011/0298321 | A1 | * | 12/2011 | Tang et al. ................. 310/71 |

FOREIGN PATENT DOCUMENTS

WO   WO 2010118647 A1 * 10/2010
WO   WO 2010118648 A1 * 10/2010

* cited by examiner

*Primary Examiner* — Alex W Mok
(74) *Attorney, Agent, or Firm* — Matthias Scholl P.C.; Matthias Scholl

(57) ABSTRACT

A structure for heat dissipation of motors including a heat dissipation component. A plurality of bosses for heat dissipation is arranged at intervals on the bottom of the heat dissipation component and an airflow passage is formed at the periphery of each boss. The heat dissipation component is a motor controller or an end cover. The structure for heat dissipation of motors is simple and reasonable. It features fast dissipation speed and excellent dissipation effects. It uses fewer materials, and is low in cost.

5 Claims, 6 Drawing Sheets

STRUCTURE FOR HEAT DISSIPATION OF MOTORS

CROSS-REFERENCE TO RELATED APPLICATIONS

Pursuant to 35 U.S.C. §119 and the Paris Convention Treaty, this application claims the benefit of Chinese Patent Application No. 201020698174.7 filed Dec. 31, 2010, the contents of which are incorporated herein by reference.

BACKGROUND OF THE INVENTION

1. Field of the Invention

The invention relates to the category of motors, and more particularly to a structure for heat dissipation of motors.

2. Description of the Related Art

Conventional structures for heat dissipation of a motor controller or end cover are cast aluminum pieces, on the bottom of which straight strip-shaped radiating ribs are disposed parallelly for heat dissipation purpose. A control chip is firmly attached to the inner surface of the motor controller. However, this kind of heat dissipation method has the following disadvantages: 1) the air can only flow in the direction parallel to the radiating ribs, resulting in slow heat dissipation and poor dissipation effects; 2) straight strip-shaped radiating ribs have low dissipation efficiency and a large number of materials are wasted leading to relatively high costs.

SUMMARY OF THE INVENTION

In view of above-described problems, it is one objective of the invention to provide a structure for heat dissipation of motors that is simple and reasonable with fast dissipation speed, excellent dissipation effects, less materials, and low costs.

To achieve the above objective, in accordance with one embodiment of the invention, there provided is a structure for heat dissipation of motors, comprising a heat dissipation component, wherein a plurality of bosses for heat dissipation are arranged at intervals on the bottom of the heat dissipation component and an airflow passage is formed at the periphery of each boss.

In a class of this embodiment, the heat dissipation component is a motor controller or an end cover.

In a class of this embodiment, the bosses for heat dissipation are arranged on a plurality of straight lines.

In a class of this embodiment, the plurality of straight lines is radial lines passing through a center.

In a class of this embodiment, the bosses for heat dissipation aligned on the plurality of straight lines are evenly distributed.

In a class of this embodiment, the bosses for heat dissipation are arranged along a plurality of curves.

In a class of this embodiment, the plurality of curves is arc lines bending from central points towards edges thereof.

In a class of this embodiment, the bosses for heat dissipation on the plurality of curves are evenly distributed.

In a class of this embodiment, the bosses for heat dissipation are of cylinders or cubes.

In a class of this embodiment, the bosses for heat dissipation and the heat dissipation component are cast aluminum pieces.

Advantages of the invention are summarized as follows:

1) a plurality of bosses for heat dissipation is arranged at interval on the bottom of the dissipation component and an airflow passage is formed at the periphery of each boss. The accumulated heat can be dispersed along the periphery of the dissipation bosses. Such structure can be mounted freely with fast dissipation speed and excellent dissipation effects;

2) a plurality of bosses for heat dissipation is arranged on a plurality of straight lines, these straight lines are radial lines passing though the center and the bosses for heat dissipation on the plurality of straight lines are evenly distributed or arranged along a plurality of curves, the plurality of curves are arc lines bending towards their edges from the central points. Such structure is simple, reasonable and the accumulated heat can be dispersed along the periphery of the bosses for heat dissipation. Such structure can be mounted freely with convenient installation and high dissipation efficiency and without affecting the dissipation effects; and 3) the bosses for heat dissipation are of cylinders or cubes. Compared with the conventional straight strip-shaped radiating ribs, the dissipation perimeter formed by the bosses for heat dissipation is the same as the area of the straight strip-shaped radiating ribs, having the same dissipation effects while more than half of the materials are saved and thus the production costs are reduced.

DETAILED DESCRIPTION OF THE EMBODIMENTS

The invention is explained in further detail below with the reference to the embodiments and attached drawings.

Example 1

Figure 1:
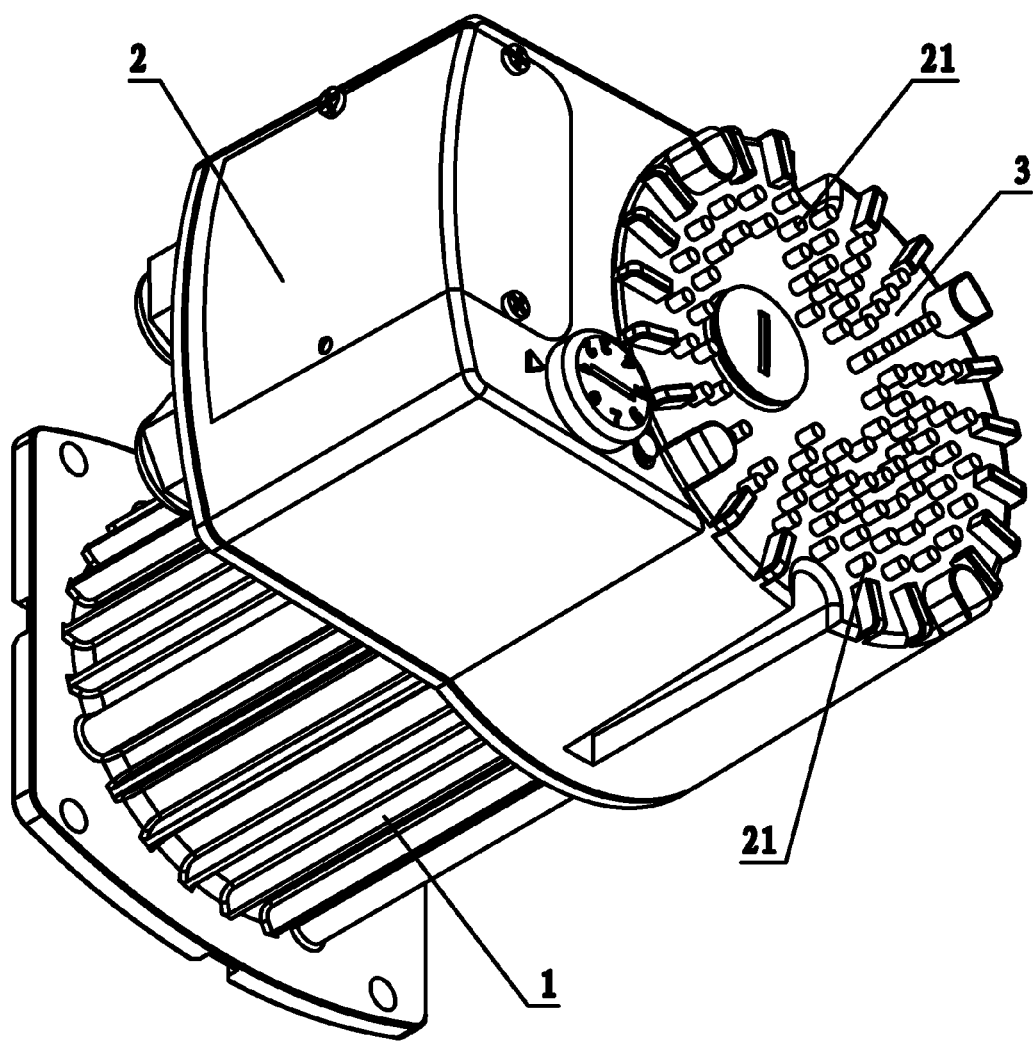
FIG. 1 is a three-dimensional diagram of a structure for heat dissipation of motors in accordance with one embodiment of the invention.
Figure 2:
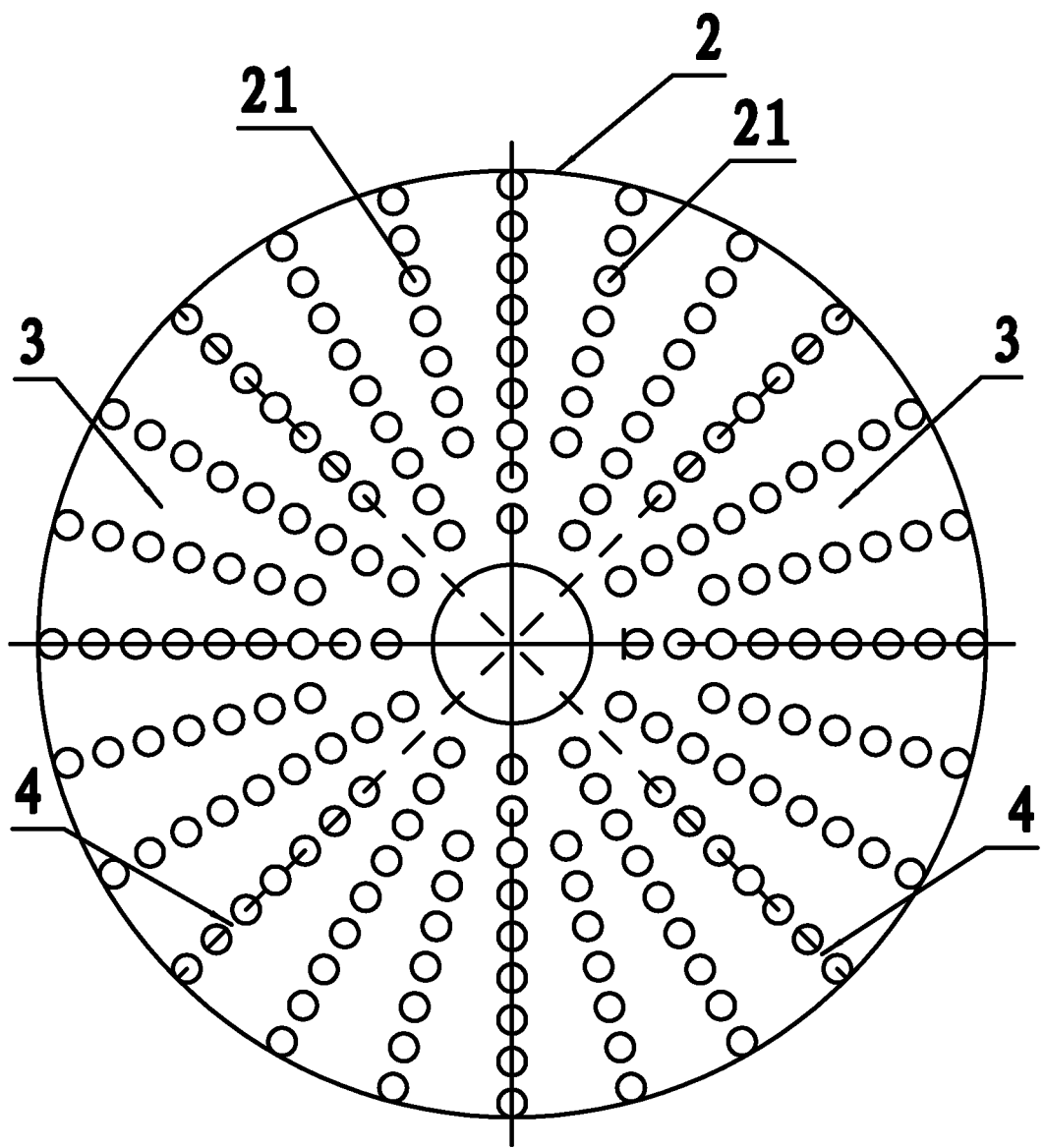
FIG. 2 is a distribution schematic diagram of bosses for heat dissipation in accordance with one embodiment of the invention.

As shown in FIGS. 1 and 2, a structure for heat dissipation of motors, in accordance with the invention, comprises a motor body 1 and a heat dissipation component 2. The heat dissipation component is a controller. A plurality of bosses for heat dissipation 21 is arranged at certain interval on the bottom of the controller and an airflow passage 3 is formed at the periphery of each heat dissipation boss 21. The plurality of bosses for heat dissipation 21 is distributed on a plurality of straight lines 4, which are radial lines passing through a center. The bosses for heat dissipation 21, either cylinders or cubes, are evenly distributed on a plurality of straight lines 4. The bosses for heat dissipation 21 and the controller are cast aluminum pieces.

Figure 3:
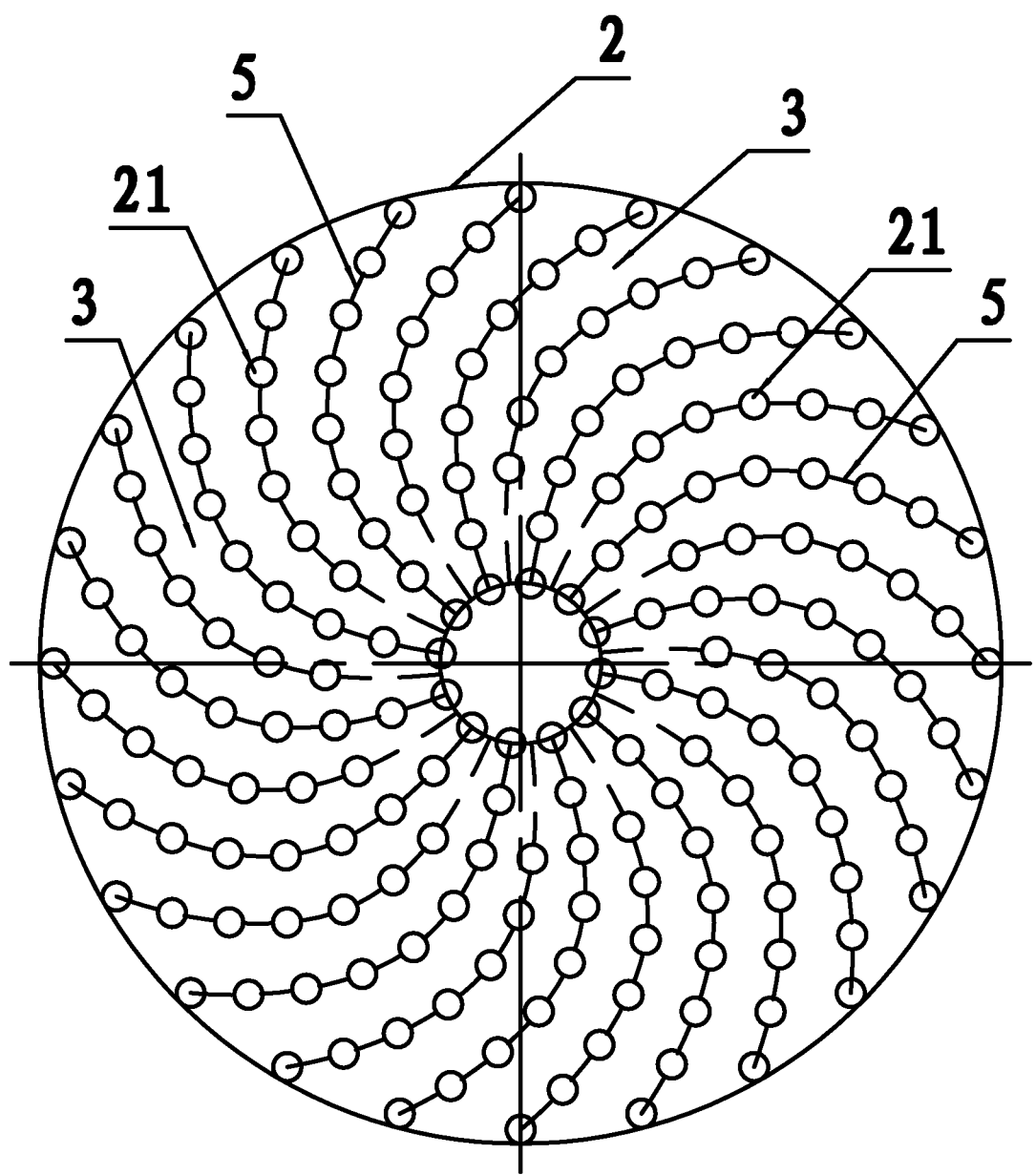
FIG. 3 is a distribution schematic diagram of bosses for heat dissipation in accordance with another embodiment of the invention.
Figure 4:
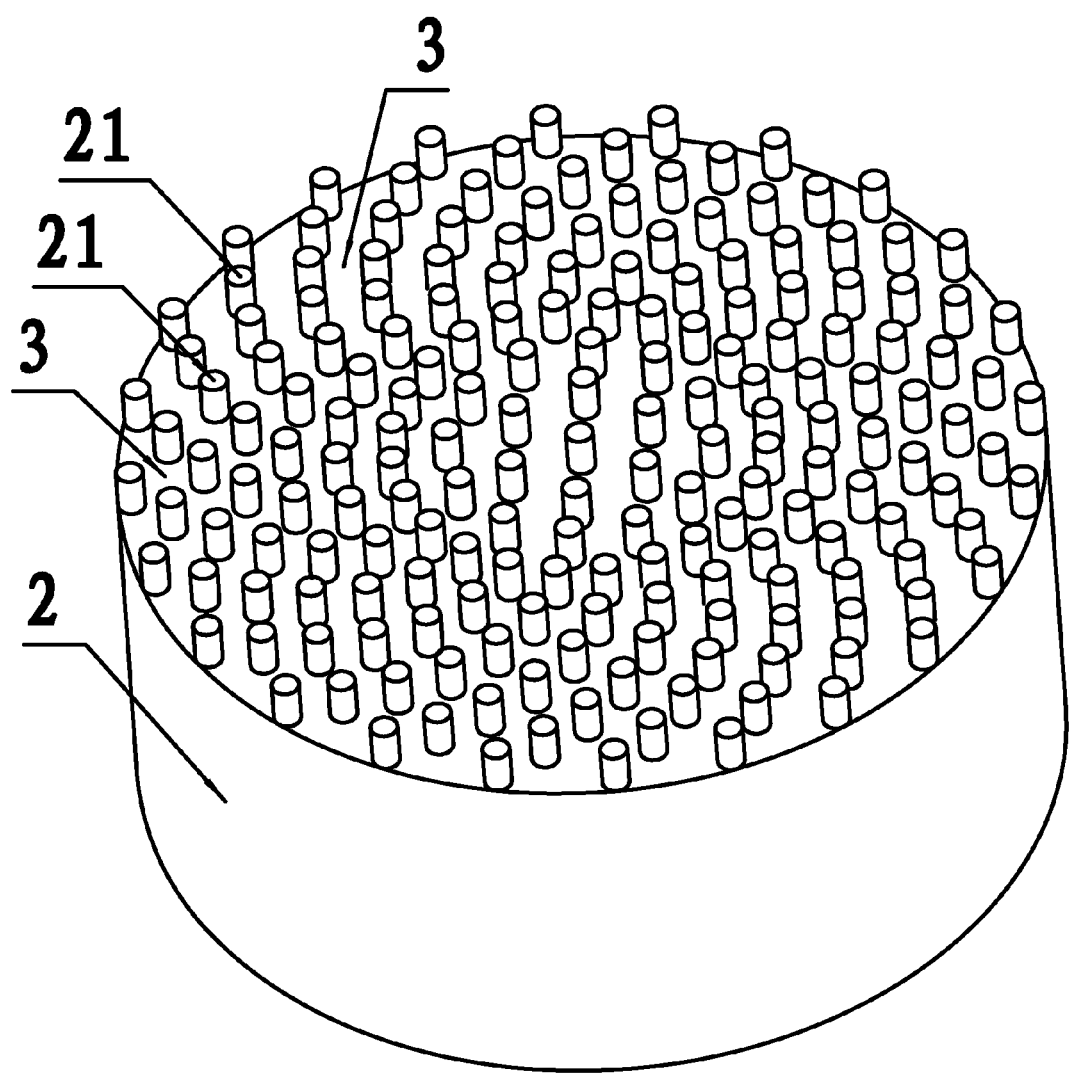
FIG. 4 is a three-dimensional diagram of a controller in accordance with one embodiment of the invention.

As shown in FIGS. 1, 3, and 4, a structure for heat dissipation of motors, in accordance with the invention, comprises a motor body 1 and a controller. A plurality of bosses for heat dissipation 21 is arranged at certain interval on the bottom of the controller and an airflow passage 3 is formed at the periphery of each boss 21. The plurality of bosses for heat dissipation 21 is arranged along a plurality of curves 5, which are arc lines bending towards their edges from a central point. The plurality of bosses for heat dissipation 21 on the plurality of curves 5 is evenly distributed. The bosses for heat dissipation 21 are of cylinders or cubes. The bosses for heat dissipation 21 and the controller are cast aluminum pieces.

In accordance with the invention, the plurality of bosses for heat dissipation 21 is arranged at certain interval and the airflow passage 3 is formed at the periphery of each heat dissipation boss 21. The accumulated heat can be dispersed along the airflow passage 3 at the periphery of the bosses for heat dissipation 21. Such structure can be mounted freely with convenient installation and high dissipation efficiency. The heat dissipation perimeter formed by the bosses for heat dissipation 21 is the same as the area of the straight strip-shaped radiating ribs, having the same dissipation effects while more than half of the materials are saved and thus the production costs are reduced.

Example 2

Figure 5:
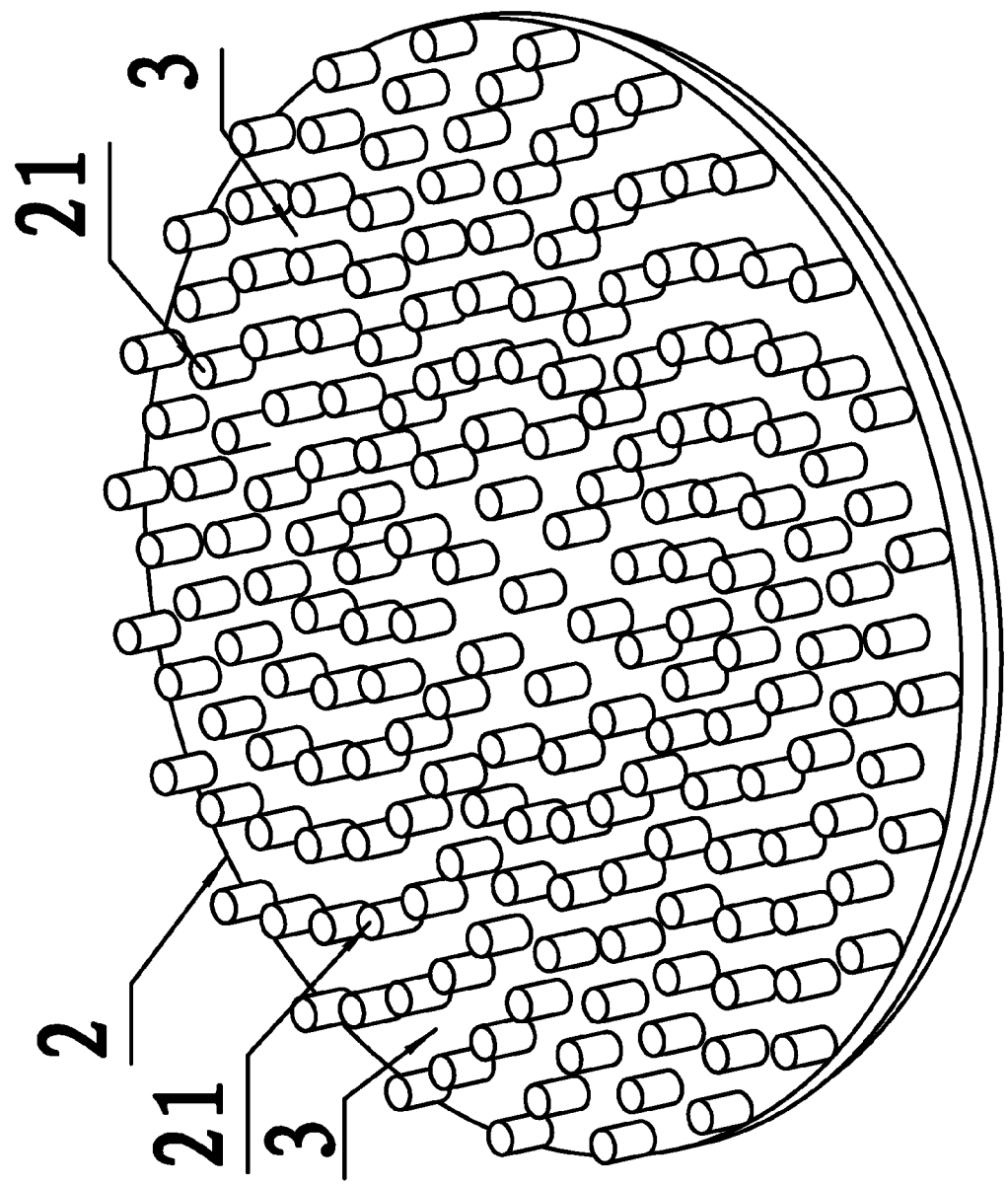
FIG. 5 is a three-dimensional diagram of an end cover in accordance with one embodiment of the invention.
Figure 6:
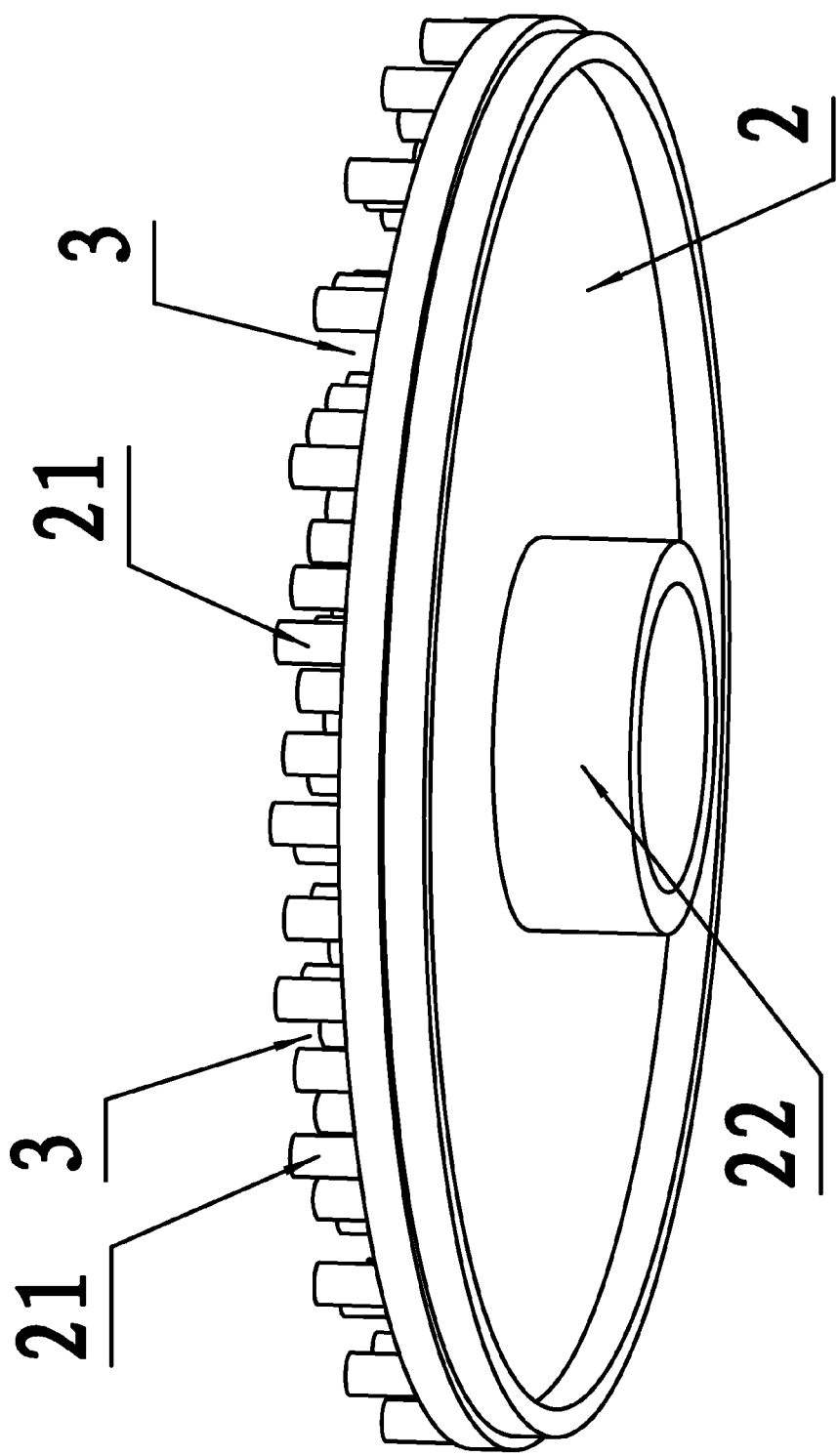
FIG. 6 is a three-dimensional diagram of an end cover viewed from another direction in accordance with one embodiment of the invention.

As shown in FIGS. 2, 5, and 6, a structure for heat dissipation of motors, in accordance with the invention, comprises a heat dissipation component 2. The heat dissipation component 2 is an end cover. A plurality of bosses for heat dissipation 21 is arranged on the bottom side of the end cover and a bearing chamber 22 is on the other side. The plurality of bosses for heat dissipation 21 is arranged at certain interval and an airflow passage 3 is formed at the periphery of each boss 21. The plurality of bosses for heat dissipation 21 is distributed on a plurality of straight lines 4, which are radial lines passing through a center. The bosses for heat dissipation 21, either cylinders or cubes, on the plurality of straight lines 4 are evenly distributed. The bosses for heat dissipation 21 and the end cover are cast aluminum pieces.

As shown in FIGS. 3, 5, and 6, a structure for heat dissipation of motors, in accordance with the invention, comprises an end cover. A plurality of bosses for heat dissipation 21 is arranged on the bottom side of the end cover and a bearing chamber 22 is on the other side. The plurality of bosses for heat dissipation 21 is arranged at certain interval and an airflow passage 3 is formed at the periphery of each boss 21. The plurality of bosses for heat dissipation 21 is arranged along a plurality of curves 5, which are arc lines bending towards their edges from the central point. The plurality of bosses for heat dissipation 21 on the plurality of curves 5 is evenly distributed. The bosses for heat dissipation 21 are of cylinders or cubes. The bosses for heat dissipation 21 and the end cover are cast aluminum pieces.

In accordance with the invention, the plurality of bosses for heat dissipation 21 is arranged at certain interval and the airflow passage 3 is formed at the periphery of each heat dissipation boss 21. The accumulated heat can be dispersed along the airflow passages 3 at the periphery of the bosses for heat dissipation 21. Such structure can be mounted freely with convenient installation and high dissipation efficiency and without affecting the dissipation effects. The dissipation perimeter formed by the bosses for heat dissipation 21 is the same as the area of the strip-shaped radiating ribs, having the same dissipation effects while more than half of the materials are saved and thus the production costs are reduced.

While particular embodiments of the invention have been shown and described, it will be obvious to those skilled in the art that changes and modifications is made without departing from the invention in its broader aspects, and therefore, the aim in the appended claims is to cover all such changes and modifications as fall within the true spirit and scope of the invention.

The invention claimed is:
1. A structure for heat dissipation of motors, comprising a heat dissipation component, the heat dissipation component comprising an inner area, an outer area, a center point, and a periphery;
wherein:
   a plurality of bosses is arranged at intervals on the bottom of the heat dissipation component and an airflow passage is formed at the periphery of each boss;
   the heat dissipation component is a motor controller or an end cover;
   the bosses are arranged along a plurality of curves;
   the plurality of curves is arc lines bending from central points of the heat dissipation component towards edges of the heat dissipation component;
   the bosses are evenly distributed along the plurality of curves;
   the plurality of curves is spaced from one another and a plurality of airflow passages is formed between adjacent curves;
   the bosses that are disposed at an inner end of each of the plurality of curves are circumferentially distributed and are spaced from one another;
   a plurality of openings is formed between adjacent bosses that are disposed at the inner end of each of the plurality of curves;
   the plurality of openings has equal widths;
   the plurality of bosses forms a plurality of concentric circles;
   the center of the plurality of concentric circles is superposed with the center point;
   one of the plurality of concentric circles separates the inner area from the outer area;
   a first part of the plurality of concentric circles is disposed in the inner area;
   a second part of the plurality of concentric circles is disposed in the outer area;
   each of the concentric circles in the first part of the plurality of concentric circles comprises a first number of bosses;
   each of the concentric circles in the second part of the plurality of concentric circles comprises a second number of bosses; and
   the second number is greater than the first number.

2. The structure of claim 1, wherein the bosses for heat dissipation are cylinders or cubes.

3. The structure of claim 2, wherein the bosses for heat dissipation and the heat dissipation component are cast aluminum pieces.

4. The structure of claim 1, wherein when in use, when airflow flows from one side of the heat dissipation component, the airflow is guided by the airflow passages to flow into the heat dissipation component from the one side of the heat dissipation component, to flow through the bosses and exchange heat with the bosses, and to flow out of the heat dissipation component from an opposite side of the heat dissipation component.

5. The structure of claim 1, wherein when in use, when airflow flows from one side of the heat dissipation component, turbulence caused by the airflow in the center point is reduced as compared to a structure in which the number of bosses on each concentric circle formed by the bosses is the same.

* * * * *